United States Patent [19]
Anderson et al.

[11] Patent Number: 5,938,766
[45] Date of Patent: *Aug. 17, 1999

[54] SYSTEM FOR EXTENDING FUNCTIONALITY OF A DIGITAL ROM USING RAM/ROM JUMP TABLES AND PATCH MANAGER FOR UPDATING THE TABLES

[75] Inventors: Eric C. Anderson; Celeste Johnson, both of San Jose, Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,773

[22] Filed: Mar. 21, 1997

[51] Int. Cl.$^6$ .................................................. G06F 9/445
[52] U.S. Cl. ........................ 713/100; 395/712; 348/231; 348/233; 348/552
[58] Field of Search ................................... 395/567, 385, 395/712, 653, 651, 652; 345/203; 358/444; 399/77, 83; 348/231, 233, 552

[56] References Cited

U.S. PATENT DOCUMENTS

| | | | |
|---|---|---|---|
| 4,425,618 | 1/1984 | Bishop et al. | 395/567 |
| 4,542,453 | 9/1985 | Patrick et al. | 395/868 |
| 5,410,703 | 4/1995 | Nilsson et al. | 395/712 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,481,713 | 1/1996 | Wetmore et al. | 395/712 |
| 5,493,335 | 2/1996 | Parulski et al. | 348/231 |
| 5,546,586 | 8/1996 | Wetmore et al. | 395/705 |
| 5,634,058 | 5/1997 | Allen et al. | 395/712 |
| 5,752,040 | 5/1998 | Kaneko et al. | 395/712 |

OTHER PUBLICATIONS

AppleLink Newsbytes Review—NEC PC–DC401 Digital Still Camera Tokyo, Japan 1996 Mar. 15, pp. 1–3.
IBM Technical Disclosure Bulletin, Dual Indirect RAM/ROM Jump Tables for Firmware Updates, vol. 31, No. 1, Jun. 1988.
PCMCIA Standards, Release 2, Nov. 1992, pp. 5–3 to 5–4 and 5–47 to 5–52.
David D. Busch, *PC/MS DOS 4.0 for Hard Disk Users*, Bantam Books, 1989, pp. 33–41.
Cain, Thomas et al., *Hard Disk Management for the IBM PC XT, AT and Compatible Systems*, Prentice Hall Press, 1986, pp. 59–61.

Primary Examiner—Richard L. Ellis
Attorney, Agent, or Firm—Carr & Ferrell LLP; Gregory J. Koerner

[57] ABSTRACT

A system and method for extending the functionality of a digital system is disclosed. The system includes a read-only memory (ROM) for storing an extendible control application, a processing unit for executing the code stored in ROM, an imaging device for capturing optical images and converting them to digital code, random-access memory (RAM) for providing working memory for the processing unit and storage for files and images, an input-output (I/O) device for receiving user input and communicating with a host computer to transfer images and files, and an optional removable memory for providing storage for images and a means for introducing extensions into the system. The ROM image includes a patch manager and function pointers which, together, permit the redirection of the program execution sequence. New pieces of code (extensions) can, through such redirection, be incorporated into the original, non-modifiable control application, to supplement or replace routines of the original control application.

17 Claims, 12 Drawing Sheets

Table of Extension Types

| NAME | ABREV. | DESCRIPTION |
|---|---|---|
| Camera Extension Module | CEM | Contains new functions, or replaces current functions of the same name. |
| Image Processing Module | IPM | Contains new IPM's to be integrated into the image processing chain. |
| Camera Thread Module | CTM | Contains a new thread that can be invoked via a host command. |
| File Extension Module | FEM | Contains new file extension information for images. |
| Camera Application Module | CAM | Contains a new application for the camera that can be invoked via a host command. |
| Inter-Color Consortia | ICC | Contains a device color profile. |
| Camera Script Module | CSM | Contains scripts to be accessible to the user. |

SYSTEM FOR EXTENDING FUNCTIONALITY OF A DIGITAL ROM USING RAM/ROM JUMP TABLES AND PATCH MANAGER FOR UPDATING THE TABLES

BACKGROUND OF THE INVENTION

This invention relates generally to digital electronic systems and, in particular, to digital systems having a control application program loaded into a memory device within the digital system. A digital camera is one example of such a system, however the present invention is applicable to a wide variety of digital systems, including portable consumer electronics products as well as custom industrial systems.

Typically, these systems are microprocessor based, and the control application is stored in a read-only memory (ROM), which is permanently mounted in the system. In addition to being inexpensive, storing the control application in a ROM has the added benefit of making it more difficult for the user to corrupt the application code.

Storing the control application in ROM also has some disadvantages. The major disadvantage is that the control application cannot be easily modified to take advantage of new software developments or to remove existing program defects. In order to modify the application program, the ROM must be physically removed and replaced with a new ROM containing the new code.

Some limitations to modifying the control application can be overcome by introducing additional components to the system. As shown in FIG. 1, an example of such a system 100 includes processing unit 105, ROM 110, random-access memory (RAM) 115, controlled equipment 120, input-output (I/O) device 125, and removable memory 130, all interconnected via bus 135. Typically, as shown in FIG. 2, the control application in ROM 110 is copied into RAM 115, where it can then be modified and executed by processing unit 105. For example, routine X 205 in ROM 110 has been replaced with updated routine X.1 210. Then, instead of Routine 2 (in ROM 110) calling Routine X at its ROM address, as indicated by arrow 215, Routine 2 (in RAM 115) calls Routine X.1 at its RAM address, as indicated by arrow 220. Generally, updated routines are copied in from I/O 125 or, alternatively, from removable memory 130.

A major disadvantage of this approach is that it uses a greater amount of RAM, a more valuable resource than ROM. For example, in digital cameras, captured images are generally stored in RAM. Therefore, the more RAM that is used by the control application, the less RAM there is available for captured images. Thus, what is needed is an extensible digital system that uses less of the valuable RAM resource.

SUMMARY OF THE INVENTION

The present invention is a system and method for extending the functionality of a digital system and is described with reference to a digital camera, although the present invention may be practiced in any type of digital system where it may be desirable to extend the functionality of the system's original control application stored in non-modifiable memory. The system includes read-only memory (ROM) for storing an extendible control application, a processing unit for executing the code stored in ROM, an imaging device for capturing optical images and converting them to digital data, random-access memory (RAM) for providing working memory for the processing unit and storage for files and images, an input-output (I/O) device for receiving user input and communicating with a host computer to transfer images and files, and an optional removable memory for providing storage for images and a means for introducing extensions into the system. Extensions are pieces of executable code that supplement or replace the routines contained in the original control application.

The extensibility of the control application is provided by including a patch manager and function pointers in the original ROM image. The function pointers contain the ROM addresses of the routines in the control application. At start-up, the patch manager copies the function pointers to a predetermined RAM location to provide for indirect access to the ROM routines. For example, if a first ROM routine needs to call a second ROM routine, rather than redirecting program execution directly to the ROM address of the second routine, the first routine accesses the predetermined RAM address of the function pointer for the second routine. Then, the function pointer for the second ROM routine redirects execution to the ROM address of the second routine. By modifying the RAM based pointers, the patch manager can cause the execution sequence to be diverted to the RAM address of an extension intended to replace a ROM routine.

Extensions are incorporated into the control application by the patch manager which uses a symbol file, extracted from the ROM image during development, to generate a symbol table including at least the names and ROM addresses of the routines of the original control application. The patch manager then updates the symbol table to include any detected extensions, and uses the updated symbol table to resolve and fully link any extensions detected, by modifying the function pointers and/or creating extension tables. Thereafter, the symbol file may be discarded, and the system operates as a fully functional extended system.

BRIEF DESCRIPTION OF THE DRAWINGS

FIG. 5 is a table describing exemplary extension types of the present invention;

DETAILED DESCRIPTION OF THE PREFERRED EMBODIMENT

The present invention describes a system and method for extending the functionality of a digital system. In the following detailed description, many details will be set forth, such as system type, system components, and extension types, in order to provide a thorough understanding of the present invention. However, it will be obvious to one of ordinary skill in the art that the invention may be practiced apart from these specific details. For example, the invention will be described as being embodied in an extensible digital camera, but could alternatively be embodied in a wide variety of digital systems including portable consumer electronics products as well as custom industrial systems. In other instances, details of well known software and hardware engineering practices have been omitted so as not to obscure the present invention.

Figure 1:
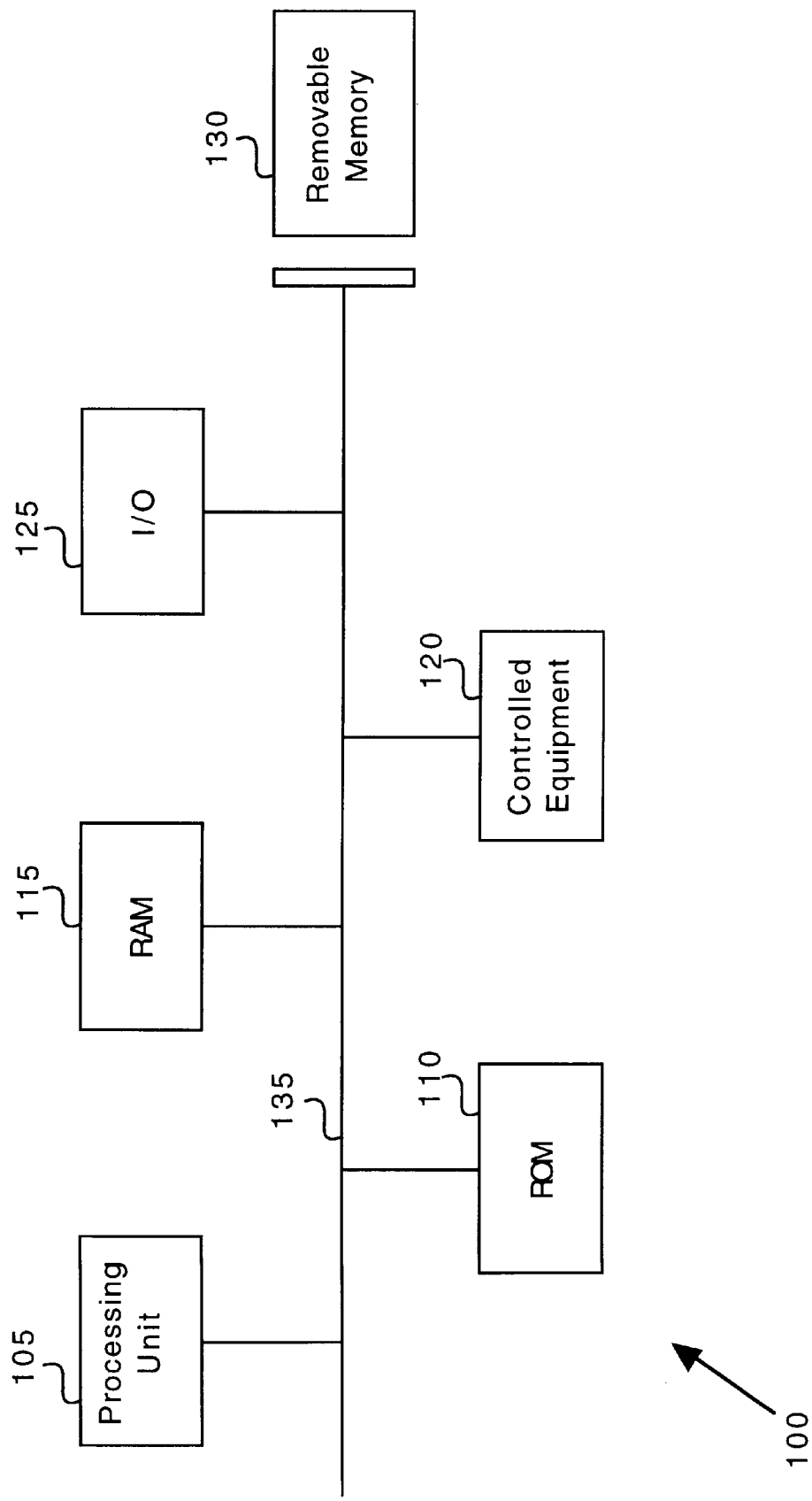
FIG. 1 is a block diagram of a prior art digital system.
Figure 2:
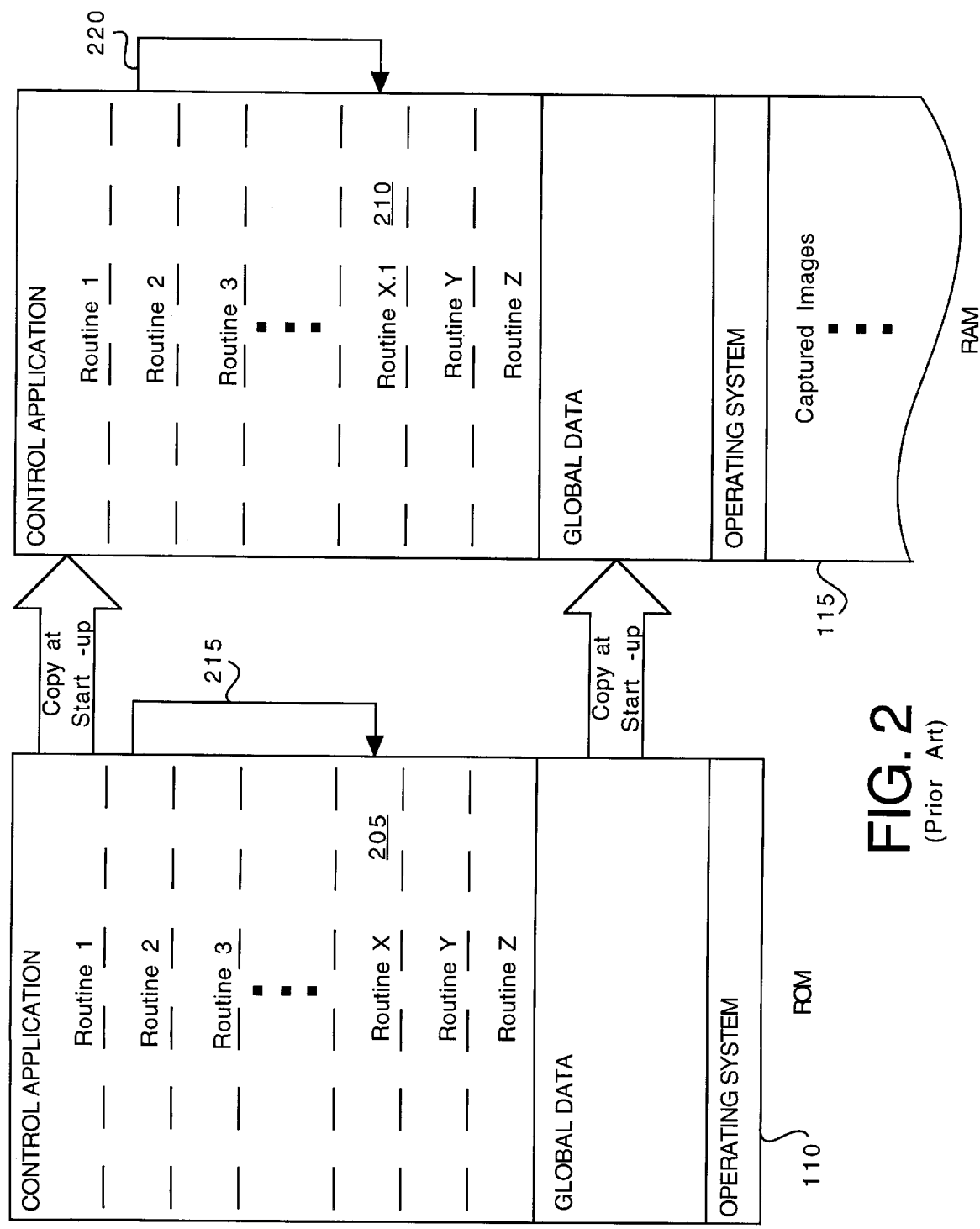
FIG. 2 is a block diagram of the RAM and ROM of the prior art digital system of FIG. 1.
Figure 3:
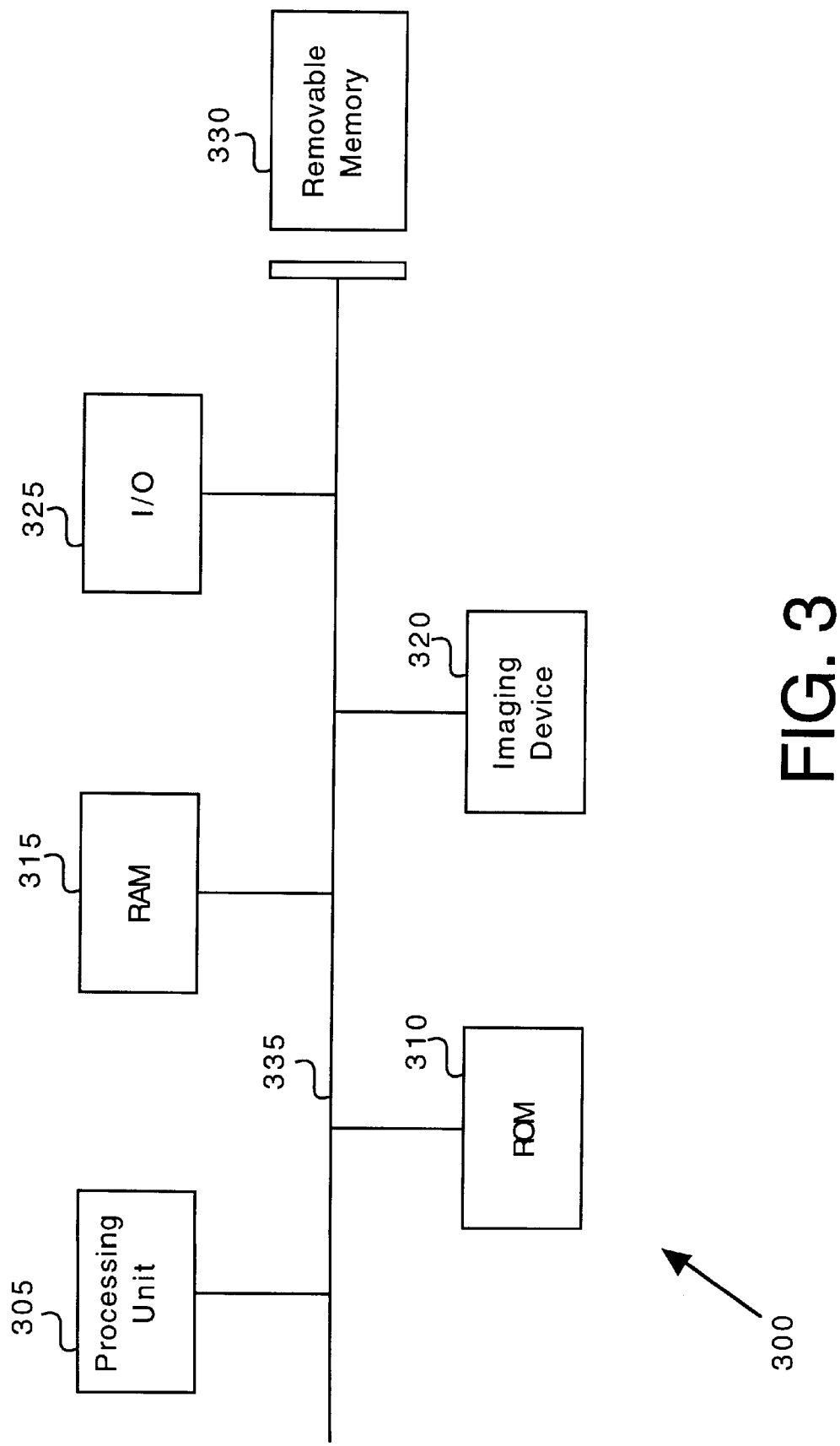
FIG. 3 is a block diagram of the preferred embodiment of the present invention, as a digital camera.

FIG. 3 shows extensible digital camera 300 including processing unit 305, ROM 310, RAM 315, imaging device 320, I/O device 325, and removable memory 330, all interconnected via system bus 335. ROM 310 stores the basic control application code and in the preferred embodiment has a capacity of approximately 1 megabyte (MB). RAM 315 provides working memory for use by processor 305 and storage for images captured by imaging device 320, and in the preferred embodiment has a capacity of approximately 4 MB. I/O device 325 provides user input, typically via mechanisms such as a shutter button or a program selection button, and allows extensions (new program code) to be loaded from an external computer. Imaging device 320 captures optical images by converting them into digital data. Removable memory 330 provides storage for captured images and an alternate method of introducing extensions to the system. Processing unit 305 controls and coordinates the interaction of ROM 310, RAM 315, imaging device 320, I/O device 325, and removable memory 330, by executing the control application code which is stored in ROM 310 and RAM 315. In the preferred embodiment, processing unit 305 is a PowerPC family microprocessor.

Figure 4:
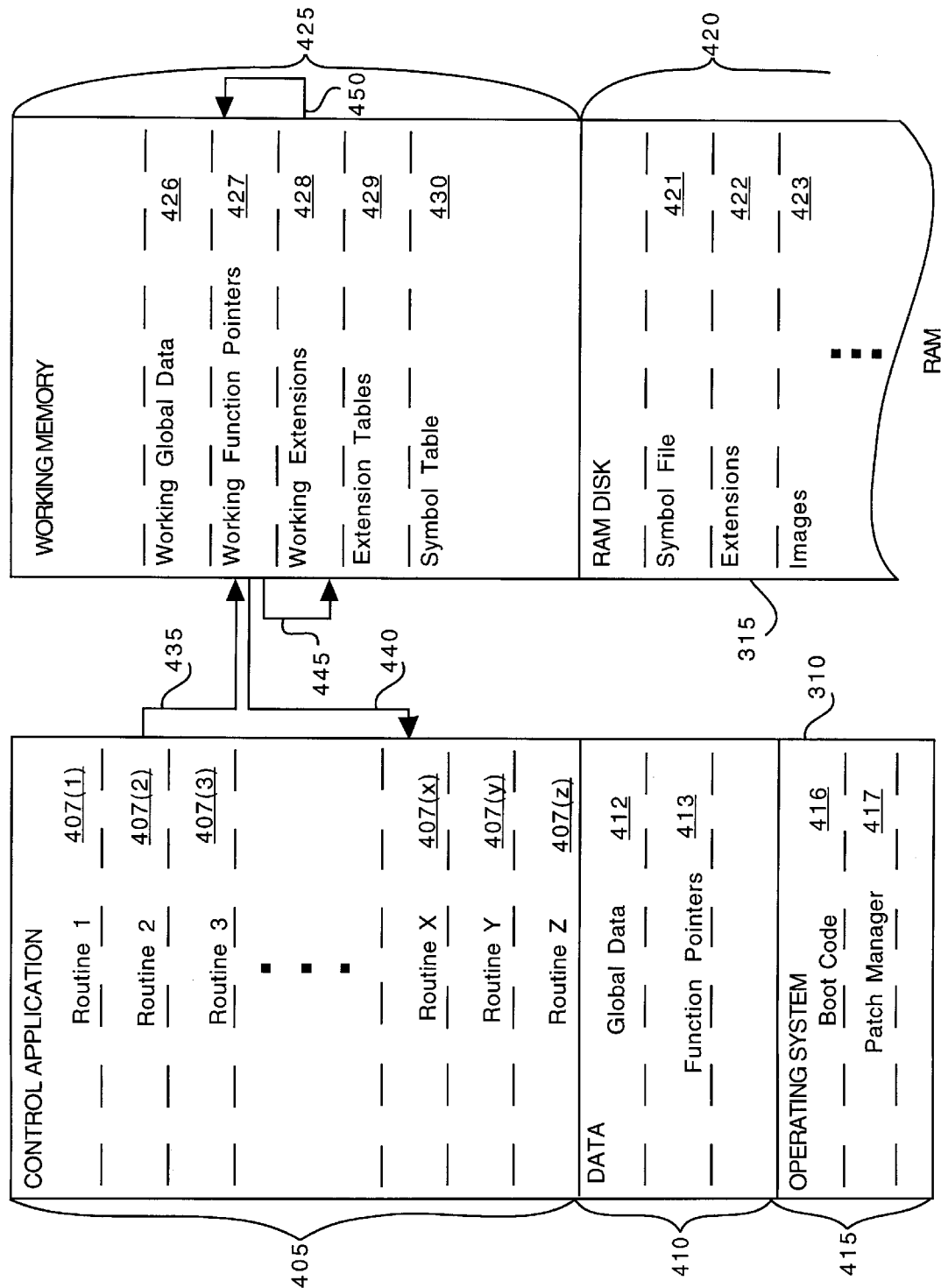
FIG. 4 is a block diagram of the RAM and ROM of the digital camera of FIG. 3.

FIG. 4, shows a detailed view of the code stored in ROM 310 and RAM 315. ROM 315 includes control application 405, data 410 and operating system 415. Control application 405 includes a plurality of sub-routines 407 (1–Z) which can be executed by processing unit 305 to control and coordinate the various components of the digital camera 300. Data 410 includes global data 412 and function pointers 413. Global data 412 defines basic system information and system variables which are used by control application 405. Function pointers 413 are pointers which, when called by processing unit 305, redirect program execution to the memory address of a selected routine. Operating system 415 is low level, machine dependent code which can be used by the higher level control application 405, and includes the basic boot code 416 and a patch manager 417. Boot code 416 is the code that is initially executed when camera 300 is powered up. Patch manager 417 is the portion of operating system 415 that is responsible for extending the functionality of camera 300 by providing for the execution of extensions which either supplement or replace one or more of routines 407(1–Z) of control application 405.

Although distinguished herein for explanatory purposes, it is understood by those skilled in the art that control application 405, data 410, and operating system 415 are all a part of the code image stored in ROM 310. Thus, in addition to modifying the execution of control application 405, patch manager 417 can also extend the functionality of data 410 and operating system 415. The only limitation is that patch manager 417 cannot patch code which is executed prior to patch manager 417 in the start-up sequence, for example boot code 416. This is because patching previously executed code may lead to operational inconsistencies.

RAM 315 provides an optional RAM disk 420 and working memory 425 for processing unit 305. RAM disk 420 provides storage for symbol file 421, extensions 422, and captured images 423. Alternatively, the storage provided by RAM disk 420 could be provided by removable memory 330. For example, symbol file 421 and extensions 422 could be loaded in removable memory 330 prior to its insertion into camera 300. Then, after storing captured images in removable memory 330, memory 330 could be removed from camera 300 and inserted into a host computer where the captured images could be downloaded and printed. Yet another alternative would be to transfer symbol file 421 and extensions 422 from an external computer, via I/O 325 and system bus 335, directly into working memory 425. Similarly, captured images could be transferred from working memory 425, via system bus 335 and I/O 325, to an external computer for further processing or printing.

Symbol file 421 is a file that is created in the development stage of control application 405, and includes at least the function name and ROM address of each of the routines 407(1–Z). Extensions 422 are pieces of code that when executed by processing unit 305 provide either new functionality to camera 300 or replace or modify functions that would otherwise be performed by routines 407(1–Z).

Working memory 425 includes working global data 426, working function pointers 427, working extensions 428, extension tables 429, and symbol table 430. At start-up, boot code 416 copies global data 412 into working memory 425 as working global data 426 and function pointers 413 into working memory 425 as working function pointers 427. Boot code 416 loads working function pointers 427 into predetermined addresses of working memory 425, because control application 405 is coded so as to call routines 407(1–Z) at these predetermined locations. Working function pointers 427 then redirect the call to the appropriate ROM address.

Next, patch manager 417 searches RAM disk 420 and removable memory 330 to determine whether symbol file 421 is present. If symbol file 421 is present, then patch manager 417 uses symbol file 421 to generate symbol table 430 which includes, at least, the name and address of each routine 407(1–Z). Then patch manager 417 searches RAM disk 420 and removable memory 330 to determine whether any extensions 422 are present. Extensions may be identified by, for example, appending a certain suffix to the file names of certain extension types, indicating to patch manager 417 that the file is an extension and its extension type. If present, patch manager 417 copies extensions 422 into working memory 425 as working extensions 428, and then updates extension tables 429 and symbol table 430 to include the names and addresses of working extensions 428. Patch manager 417 uses updated symbol table 430 to update working function pointers 427 and then insures that all routines 407(1–Z) and working extensions 428 are properly linked. After working function pointers 427 have been updated, symbol table 430 is no longer required for the operation of the extended control application, so patch manager 417 removes symbol table 430 from working memory 425, freeing a large portion of the valuable RAM resource. Extension tables 429 are retained in order to provide information as to which extensions are currently loaded, the origin file paths and the pointers to those extensions.

Once the working function pointers 427 have been updated to include working extensions 428, then control application 405 and working extensions 428 can operate together as a fully-functional, extended control application. For example, if routine 2 407(2) needs to call routine X 407(x), routine 2 407(2) would access the routine X function pointer within function pointers 427, as indicated by arrow 435. If there is no extension in working extensions 428 relating to routine X 407(x), then the routine X function pointer simply directs execution to the ROM address of routine X 407(x), as indicated by arrow 440. On the other hand, if there is an extension to modify or replace routine X 407(x), the routine X function pointer would direct execution to that extension, as indicated by arrow 445. Upon completion of the execution of the routine X extension, execution is directed to the next routine or extension (or returned to the calling routine) via function pointers 427 as indicated by arrow 450.

FIG. 5 shows a table 500 including a number of exemplary extension types. Table 500 is illustrative rather than exclusive, and a virtually unlimited number of extension types are conceivable within the scope of the invention, depending on the type of digital system and the needs of the user. The specific extensions included in table 500 relate to the preferred embodiment digital camera.

The first extension type listed is a camera extension module (CEM). A CEM provides a new function or replaces a current function of the same name. For example, if the original routine that controlled shutter speed required the user to manually select a speed, a CEM could be invoked to replace that original routine with a routine that would do a test exposure, evaluate the light level, and automatically set the shutter speed. CEMs are resolved at power on/reset and, thereafter, are invoked instead of the original function when the original function is called.

The next type of extension in table 500 is an image processing module (IPM). This type of extension includes new routines to be integrated into the camera's image processing chain. The image processing chain refers to that portion of the camera's software that manipulates captured image data in a stage by stage process to modify the captured image. Co-pending U.S. patent application Ser. No. 08/705,619, entitled "Modular Digital Image Processing Via An Image Processing Chain," filed Aug. 29, 1996, provides a detailed description of the image processing chain, and is incorporated herein by reference. For example, an IPM could be added which would increase the color depth of an image by increasing the number of bits used to indicate color and then invoking an algorithm to estimate the values of the new bits.

The next type of extension in table 500 is a camera thread module (CTM). A CTM contains a new thread that can be invoked via a host command or by a script in the camera. A thread is a separate execution sequence that runs within a process, and a host is an external computer that communicates with the camera via a communications link such as I/O 325. Thus a CTM is a piece of code that could, for example, be invoked by a computer connected to the camera to cause the camera to download captured images to the computer.

A file extension module (FEM) is an extension that contains new file extension information. The term "file extension" relates to the format of stored files, and should not be confused with the term "extension" as used in this application to indicate a new piece of code which extends the functionality of digital camera 300. Since a file extension is used to indicate the file's storage format, if a new storage format is developed after the camera is manufactured, an FEM could be invoked to enable the camera to store images in the new format.

A camera application module (CAM) is an extension that contains a new application capable of being invoked via a host command or a camera script. CAMs are similar to CTMs in that they can be invoked via a host or a script, but differ in complexity, an application being the highest level of code in the system.

An inter-color consortia (ICC) extension contains a device color profile. The purpose of an ICC is to define the color characteristics of the capture device (imaging device 320). The complexity of the ICC can be enhanced to give more accurate results. For example, if a particular user needed more accurate color capture than is possible with the original camera software, a more complex ICC patch could be used.

Finally, a camera script module (CSM) contains a script that can be accessed by the user via I/O 325. A script is a sequence of commands that are executed automatically when the script is invoked. For example, a script might be written to cause the camera to capture an image once every hour. Then the user could position the camera and invoke the script to capture a sequence of time lapse images.

The foregoing description of various extension types is illustrative and not exclusive. The examples are offered to provide a more thorough understanding of the present invention. Those skilled in the art will understand that many other extension types can be used depending on the nature of the system and the needs of the user. Thus, any extension that is incorporated to extend the functionality of the original ROM code is within the scope of the invention.

Figure 6:
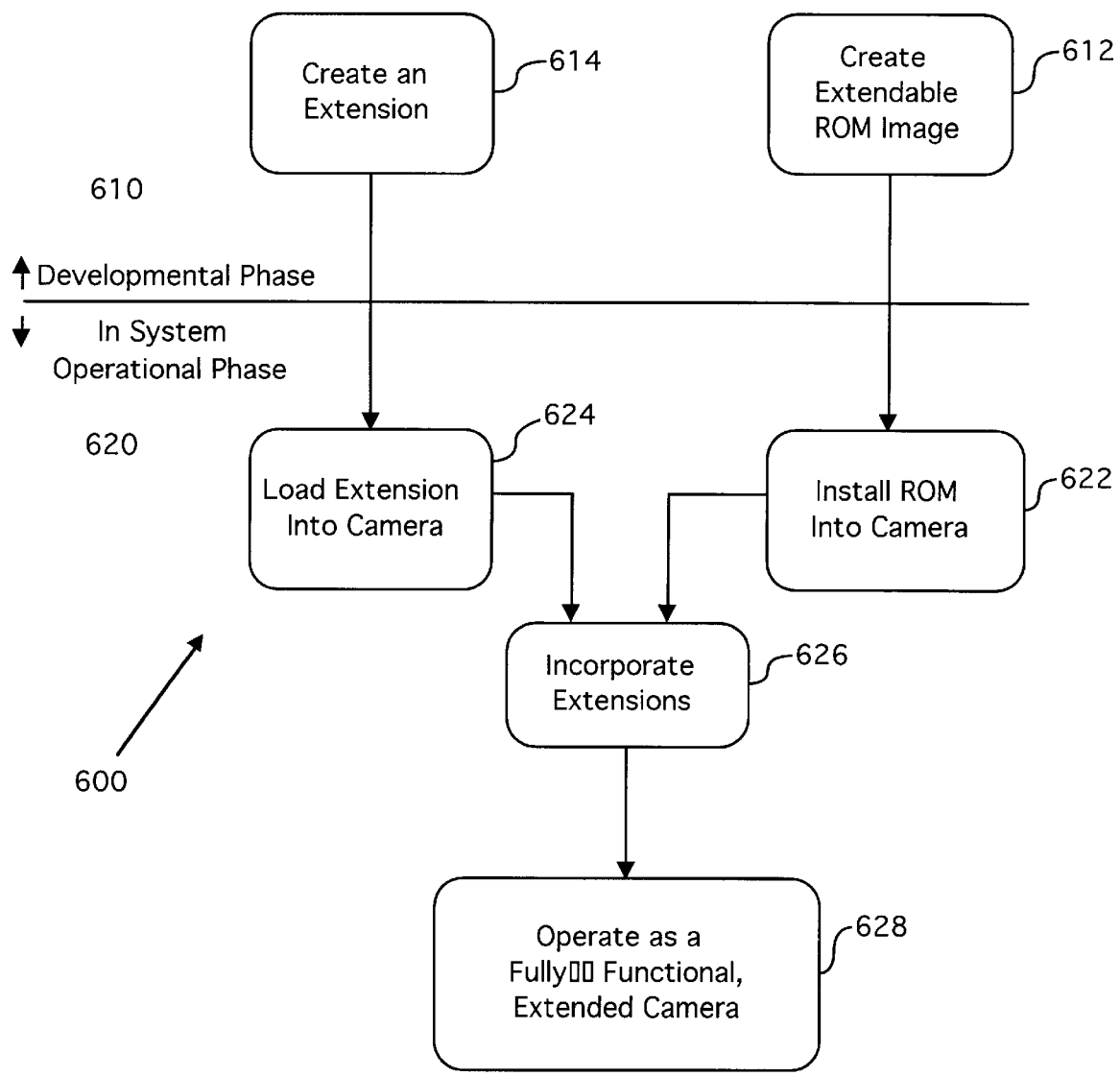
FIG. 6 is a diagrammatic overview showing the method of extending the functionality of a digital system in accordance with the present invention.

FIG. 6 is a diagrammatic overview of the method 600 for extending the functionality of a digital system, for example the preferred embodiment digital camera 300. The method includes a developmental stage 610 and an in-system operational phase 620. The developmental stage 610 includes two separate steps, a first step 612 of creating an extendible ROM image 310 and a second step 614 of creating one or more extensions 422. The two steps 612 and 614 may be undertaken simultaneously, but generally the step 612 of creating the extendible ROM image 310 occurs when the digital camera 300 is designed and manufactured, and the step 614 of creating one or more extensions 422 occurs later, when there is a need to correct an inadequacy in the original control application or to add additional functionality. The in-system operational phase includes a first step 622 of installing the ROM containing the extendible ROM image into camera 300, a second step 624 of loading one or more extensions 422 into camera 300, a third step 626 of incorporating the extensions 422 into the control application 405, and a fourth step 628 of operating the camera 300 as a fully functional, extended system.

Figure 7:
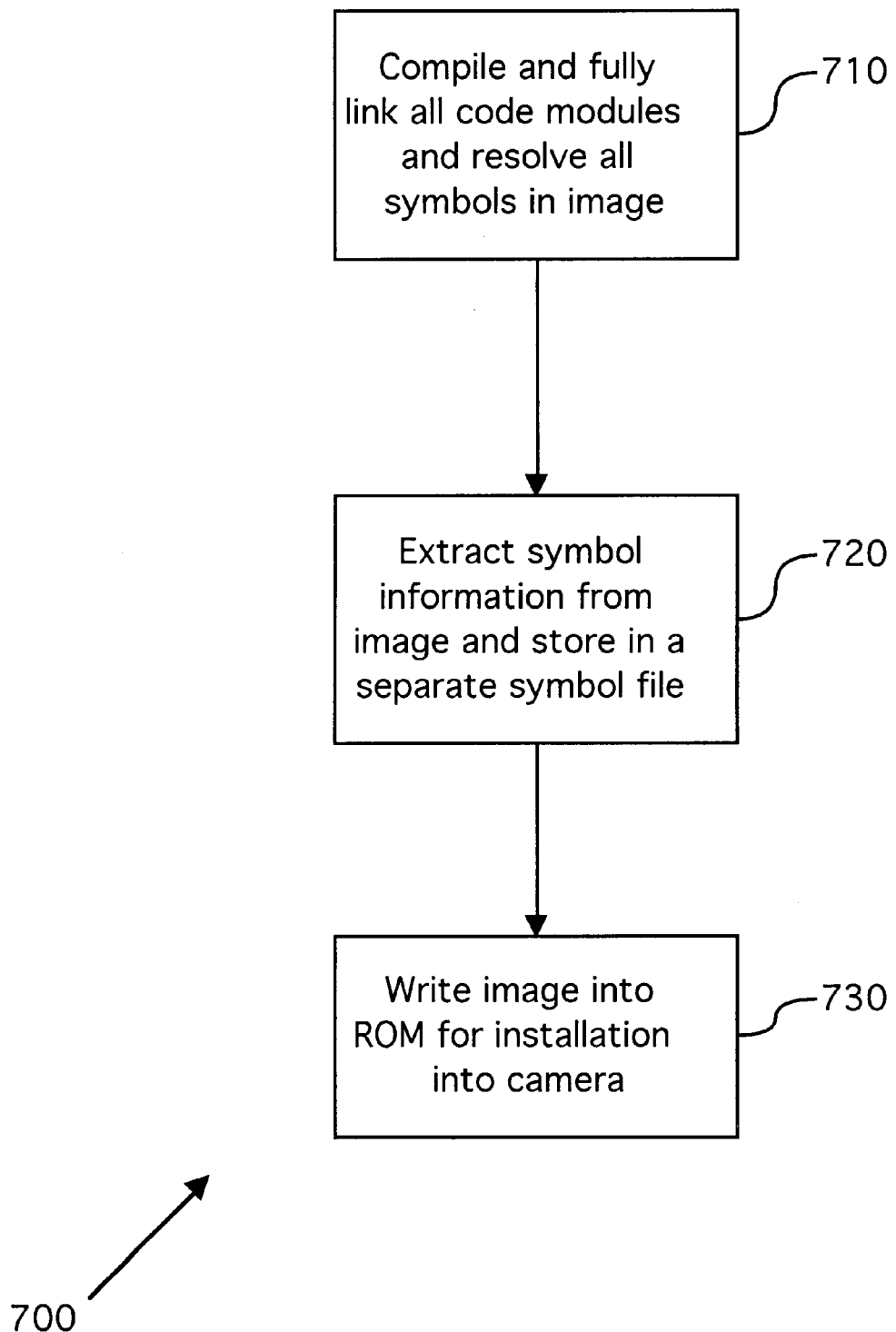
FIG. 7 is a flow chart showing the method of creating an extendible ROM image in accordance with the present invention.

FIG. 7 is a flow chart detailing the method 700 of the step 612 for creating an extendible ROM image. In a first step 710, all code modules in the in-camera software are compiled and fully linked, and all symbols are resolved. The linking in this first step 710 is dynamic, in that the symbols are linked to a RAM address where working function pointers 427 will ultimately be loaded. Then, in a second step 720, the symbol information, including the function names and addresses of the routines 407(1–Z), is extracted and stored in a separate symbol file 421. Finally, in a third step 730, the image is written into ROM 310 for installation into camera 300.

Figure 8:
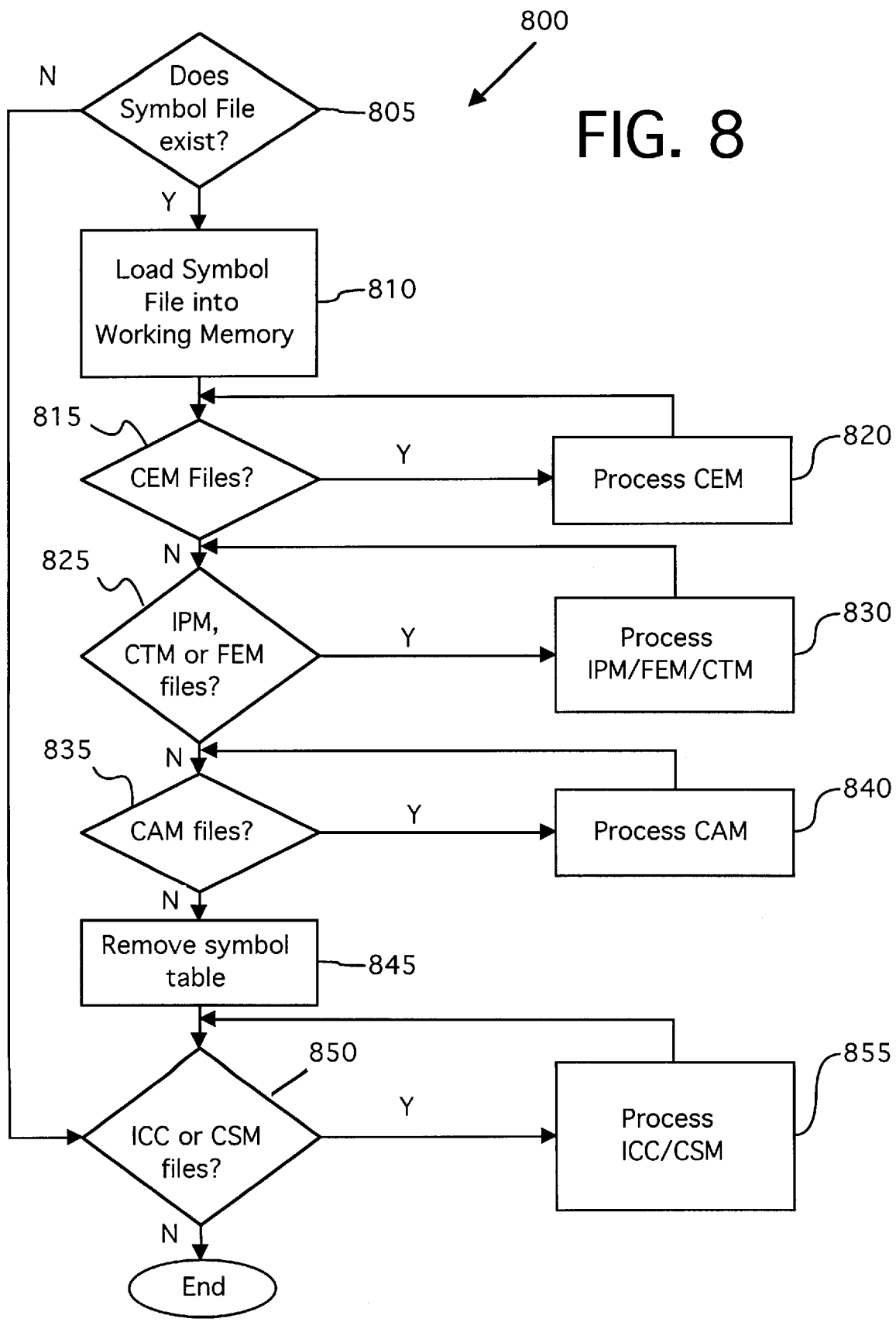
FIG. 8 is a flow chart showing the method of incorporating extensions into the control application of a digital system in accordance with the present invention.

FIG. 8 is a flow chart detailing the method 800 of the step 626 for incorporating extensions 422 into control application 405. In a first step 805, patch manager 417 searches RAM disk 420 and removable memory 330 to determine whether symbol file 421 exists. If symbol file 421 does exist, then in a second step 810 patch manager 417 uses symbol file 421 to generate and load symbol table 430 into working memory 425. Next, in a third step 815 patch manager 417 searches RAM disk 420 and removable memory 330 for CEM extensions and, if any are found, processes them in a fourth step 820. When there are no more CEMs to process, then in a fifth step 825 patch manager 417 searches RAM disk 420 and removable memory 330 for IPM, CTM and FEM extensions and, if any are found, processes them in a sixth step 830. When there are no more IPMs, CTMs, or FEMs to process, in a seventh step 835 patch manager 417 searches RAM disk 420 and removable memory 330 for CAM extensions and, if any are found, processes them in an eighth step 840. When there are no more CAMs to process, in a ninth step 845 patch manager 417 removes symbol table 430 from working memory 425. Then, in a tenth step 850 patch manager 417 searches RAM disk 420 and removable memory 330 for ICC or CSM extensions and, if any are found, processes them in an eleventh step 855. If, in the first step 805, patch manager 417 determines that symbol file 421 does not exist, then patch manager 417 proceeds directly to the tenth step 850 of searching for ICC or CSM extensions. When there are no more ICCs or CSMs to process, method 800 ends.

Figure 9:
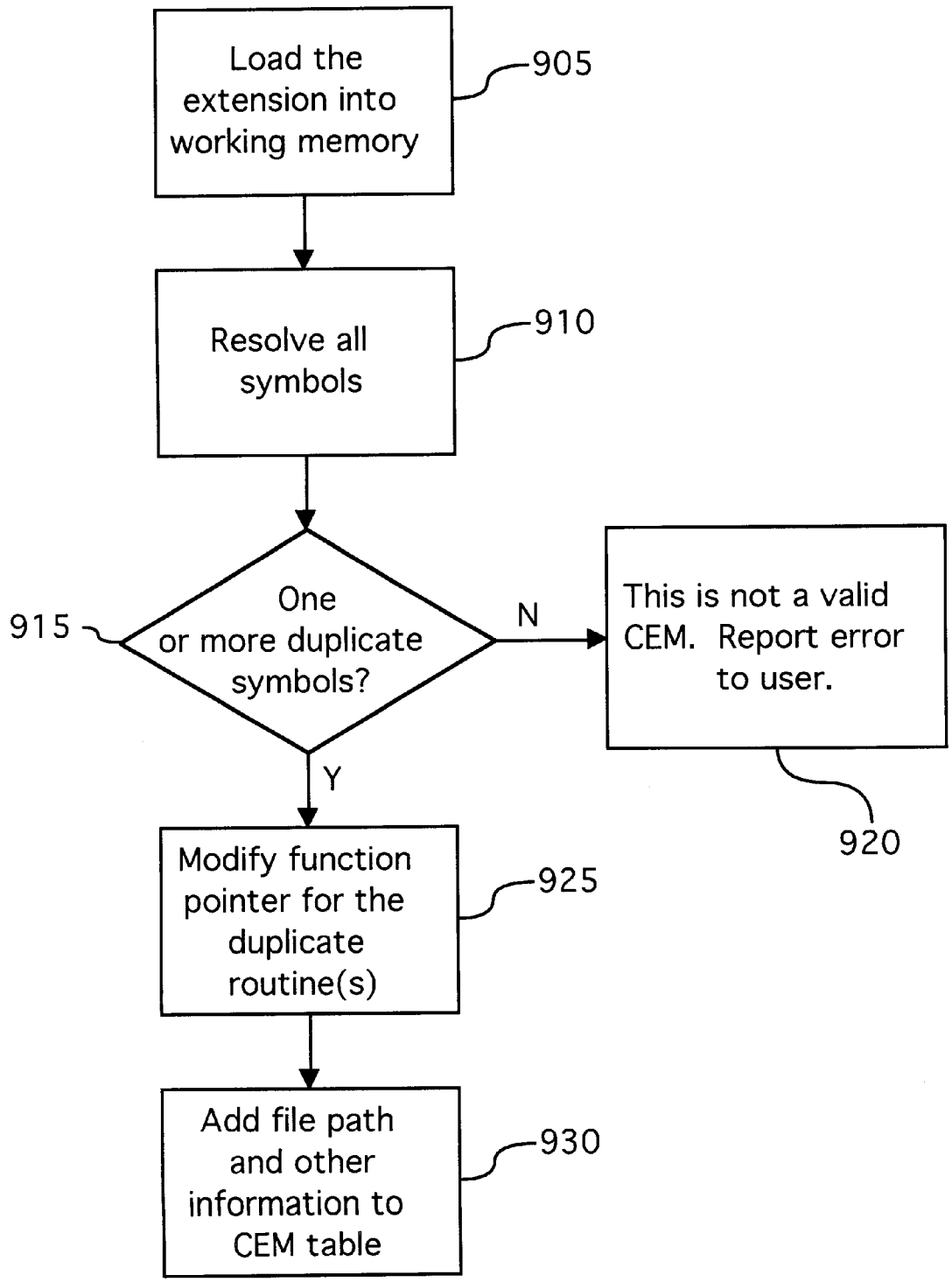
FIG. 9 is a flow chart showing the method for processing a camera extension module in accordance with the present invention.

FIG. 9 is a flow chart detailing the method 900 of the step 820 for processing a CEM extension. In a first step 905, patch manager 417 loads the CEM into working extensions 428 of working memory 425. Next, in a second step 910, patch manager 417 resolves all symbols of the CEM and then, in a third step 915, determines whether any of the symbols are duplicates of symbols in the symbol table 430. If there are no duplicate symbols, then in a fourth step 920, patch manager 417 reports an error to the user that the extension is not a valid CEM, since CEMs are intended to replace current functions. Alternatively, a CEM can introduce a new function, as long as a currently replaced function accesses the new function. If, in the third step 915, patch manager determines that one or more duplicate symbols exists, then in a fifth step 925 patch manager 417 modifies working function pointers 427 for the new routines. Finally, in a sixth step 930, patch manager 417 adds the name and file path of the CEM to the CEM table of extension tables 429.

Figure 10:
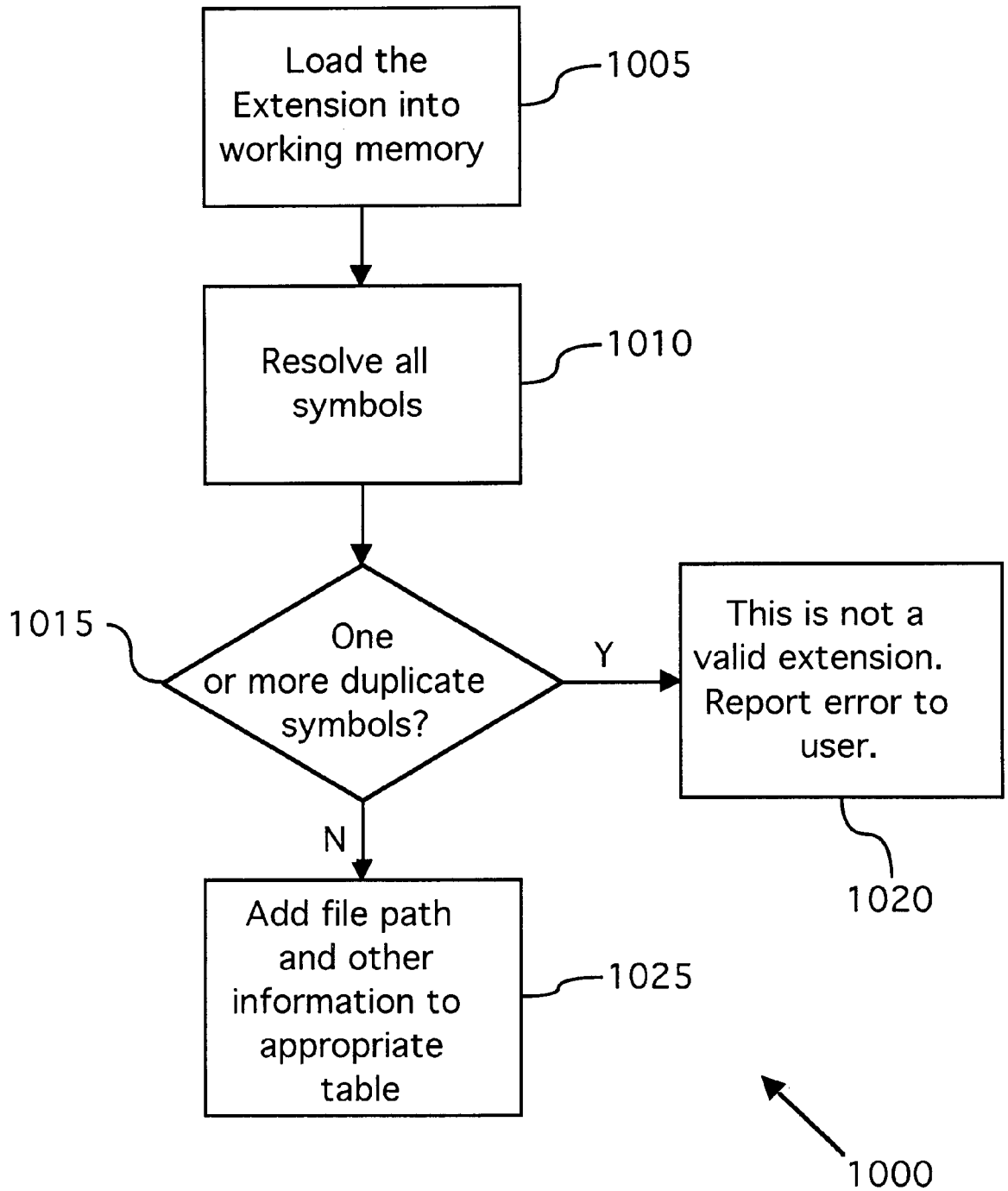
FIG. 10 is a flow chart detailing the method for processing an image processing module, a file extension module, or a camera thread module in accordance with the present invention.

FIG. 10 is a flow chart detailing the method 1000 of the step 830 of processing an IPM, FEM, or CTM extension. In a first step 1005, patch manager 417 loads the IPM, FEM, or CTM into working extensions 428 of working memory 425. Next, in a second step 1010, patch manager 417 resolves all symbols of the extension and then, in a third step 1015, determines whether any of the symbols are duplicates of symbols in the symbol table 430. If there are duplicate symbols, then in a fourth step 1020, patch manager 417 reports an error to the user that the extension is not a valid IPM, FEM, or CTM, since IPMs, FEMs, and CTMs are intended to be discrete functions. If, in the third step 1015, patch manager determines that one or more duplicate symbols do not exist, then in a fifth step 1025 patch manager 417 adds the name and file path of the IPM, FEM, or CTM to the IPM, FEM, or CTM table, respectively, of extension tables 429, and the method is complete. Working function pointers 427 need not be updated, because these extensions represent new functions and thus could not be called from control application 405.

Figure 11:
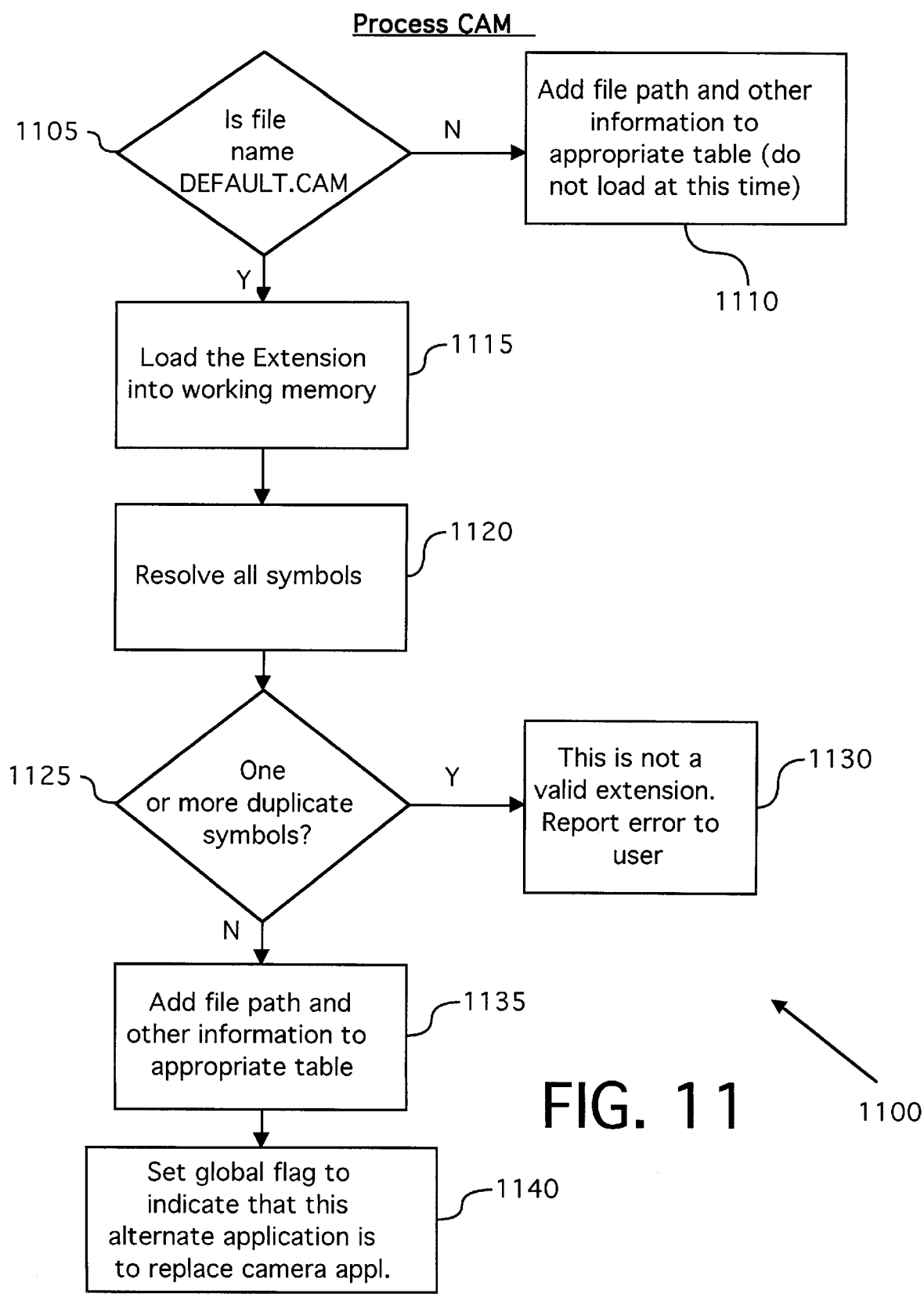
FIG. 11 is a flow chart detailing the method of processing a camera application module in accordance with the present invention.

FIG. 11 is a flow chart detailing the method 1100 of step 840 of processing a CAM. In a first step 1105, patch manager 417 determines whether the name of the CAM is "DEFAULT.CAM." If the name is not "DEFAULT.CAM," then in a second step 1110, patch manager 417 adds the file name and path to the CAM table of extension tables 429, but the CAM is not loaded into working memory and resolved until selected for execution by the user. The DEFAULT-.CAM file is a special CAM which replaces control application 405. Thus, if in the first step 1105, patch manager 417 determines that the name of the CAM is "DEFAULT.CAM," then in a third step 1115, patch manager 417 loads the CAM into working memory 425, and in a fourth step 1120 resolves all symbols in the CAM. Next, in a fifth step 1125, patch manager 417 determines whether one or more of the symbols are duplicates, and if there are duplicates, then in a sixth step 1130 reports an error to the user that the CAM is not a valid extension. If, however, in the fifth step, patch manager 417 determines that there are no duplicate symbols, then in a seventh step 1135 patch manager 417 adds the file name and path to the CAM table of the extension tables 429. Finally, in an eighth step 1140, patch manager 417 sets a global flag to indicate that this CAM is to replace the camera control application.

Figure 12:
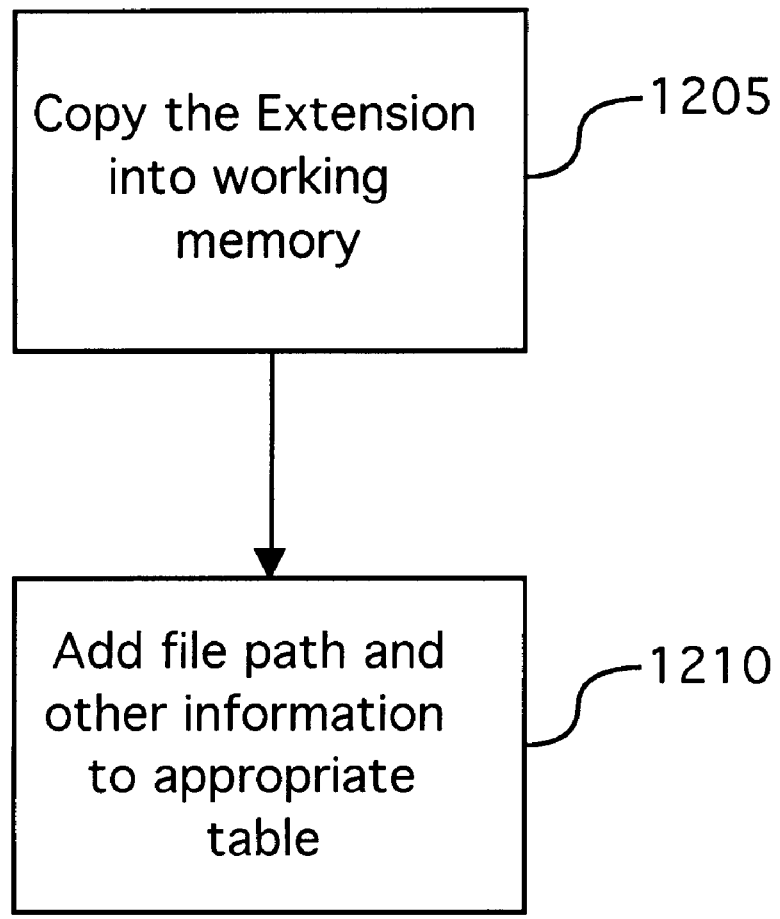
FIG. 12 is a flow chart showing the method of processing an inter-color consortia or a camera script module in accordance with the present invention.

FIG. 12 is a flow chart detailing the method 1200 of the step 855 of processing an ICC or CSM. Neither of these types of extensions need to be resolved, and thus the processing is relatively simple. In a first step 1205, patch manager 417 loads the ICC or CSM into working memory 425. Then, in a second step 1210, the name and file path are added to the ICC or CSM table, respectively, of extension tables 429. The control application 405 then uses the tables to determine whether the new functions are available and to provide access to the new functions.

The invention has been described above with reference to a preferred embodiment as a digital camera. Numerous details associated with the preferred embodiment have been set forth, such as memory capacities, processor type, and extension types. These details are not, however, limitations on the scope of the present invention. It will be obvious to those skilled in the art that the invention may be practiced apart from the specific details disclosed, and is applicable to any digital system where functionality beyond the original, non-modifiable control application is desired.

What is claimed is:

1. An extensible digital system comprising:

an imaging device for capturing and converting images to a digital data set;

a first memory, for providing data and commands;

a control application stored in said first memory and including a plurality of routines for providing functionality to said imaging device;

original function pointers stored in said first memory, for calling said routines;

a second memory, for storing data and commands, and for storing digital data sets generated by said imaging device;

at least one extension stored in said second memory for providing additional functionality for said imaging device;

working function pointers stored in said second memory, for calling said routines and said extension;

a symbol file stored in said second memory for updating said working function pointers;

a patch manager stored in said first memory for copying said original function pointers to said working function pointers for generating a symbol table from said symbol file and storing said symbol table in said second memory and for updating said working function pointers, said symbol table being disposable after said working function pointers have been updated; and a processing unit coupled to said first and second memories for processing said routines, said extension, and said patch manager.

2. The extensible digital system of claim 1 wherein said extension is a camera extension module comprising instructions for providing a new function for said imaging device or for replacing a current function of the same name.

3. The extensible digital system of claim 1 wherein said extension is a camera script module comprising a script of commands that are executed automatically by said processor when said script is invoked.

4. The extensible digital system of claim 1 wherein said extension is a camera application module comprising a new application capable of being invoked by a host command or a camera script.

5. The extensible digital system of claim 1 wherein said extension is a camera thread module comprising a new thread capable of being invoked by a host command or a camera script.

6. The extensible digital system of claim 1 wherein said extension is a file extension module comprising file extension information relating to the format of stored files.

7. The extensible digital system of claim 1 wherein said extension is an image processing module comprising new routines for integration into an image processing chain.

8. The extensible digital system of claim 1 wherein said extension is an inter-color consortia module comprising a device color profile.

9. The extensible digital system of claim 1 wherein said second memory further comprises an extension table, generated by said patch manager, for use by said patch manager in incorporating said extension into said control application.

10. The extensible digital system of claim 1 wherein said first memory comprises a read-only memory.

11. The extensible digital system of claim 1 wherein said second memory comprises a random-access memory.

12. The extensible digital system of claim 1, wherein said second memory comprises a RAM disk for storing said digital data sets.

13. The extensible digital system of claim 1, wherein said second memory comprises a resident working memory and a removable memory, said removable memory storing said digital data sets.

14. A method for creating an extensible digital system, comprising the steps of:

providing an imaging device for generating digital image sets;

storing an extendible control application including a plurality of routines in a first memory to provide functionality to said imaging device;

storing original function pointers into said first memory for calling said routines;

providing a second memory, for storing data and commands, and for storing digital image sets generated by said imaging device;

storing an extension into said second memory to provide additional functionality to said imaging devices;

storing working function pointers into said second memory, for calling said routines and said extension;

storing a symbol file into said second memory, for updating said working function pointers;

storing a patch manager into said first memory, for copying said original function pointers to said working function pointers, for generating a symbol table from said symbol file and storing said symbol table in said second memory, and for updating said working function pointers, said symbol table being disposable after said working function pointers have been updated; and incorporating said extension into said control application to provide a fully functional extended system.

15. The method of claim 14, wherein the step of storing said extension into a second memory comprises loading said extension from a removable memory.

16. An extensible digital system comprising:

imaging means for capturing and converting images to a digital data set;

first memory means, for providing data and commands, including a control application having a plurality of routines for providing functionality to said imaging means, and original pointing means for calling said routines;

second memory means, for storing data and commands, and for storing said digital data set, including at least one extension for providing additional functionality for said digital system and working pointing means for calling said routines and said extension, and a symbol file for updating said working pointing means;

patching means stored in said first memory means, for copying said original pointing means to said working pointing means, for generating a symbol table from said symbol file and storing said symbol table in said second memory means, and for updating said working pointing means, said symbol table being disposable after said working pointing means has been updated; and processing means, coupled to said first and second memory means, for processing said routines, said extension, and said patching means.

17. The extensible digital system of claim 16, wherein said second memory means comprises a resident working memory and a removable memory, said removable memory storing said digital data set.

* * * * *

UNITED STATES PATENT AND TRADEMARK OFFICE
CERTIFICATE OF CORRECTION

PATENT NO : 5,938,766
DATED : August 17, 1999
INVENTOR(S): Eric C. Anderson et al.

It is certified that error appears in the above-identified patent and that said Letters Patent is hereby corrected as shown below:

Column 8, line 61, after "memory" insert --,--.

Column 8, line 63, after "memory" insert --,--.

Column 8, line 65, after "pointers" insert --,--.

Column 9, line 2, after "memory" insert --,--.

Signed and Sealed this

Eighth Day of February, 2000

Attest:

Q. TODD DICKINSON

Attesting Officer

Commissioner of Patents and Trademarks